United States Patent
Boding et al.

(10) Patent No.: US 11,451,515 B2
(45) Date of Patent: Sep. 20, 2022

(54) ACCESS RULE MANAGEMENT

(71) Applicant: Visa International Service Association, San Francisco, CA (US)

(72) Inventors: Benjamin Scott Boding, Mountain View, CA (US); Christopher Holmes, San Jose, CA (US); Cory Siddens, Mountain View, CA (US); Henry Wong, Menlo Park, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 248 days.

(21) Appl. No.: 16/911,277

(22) Filed: Jun. 24, 2020

(65) Prior Publication Data
US 2021/0409374 A1    Dec. 30, 2021

(51) Int. Cl.
*H04L 9/40* (2022.01)

(52) U.S. Cl.
CPC ........ *H04L 63/0263* (2013.01); *H04L 63/101* (2013.01); *H04L 63/105* (2013.01); *H04L 63/20* (2013.01)

(58) Field of Classification Search
CPC . H04L 63/0263; H04L 63/101; H04L 63/105; H04L 63/20; H04L 63/102; H04L 63/108; G06Q 20/4016; G06Q 20/405
USPC .......................................................... 726/1
See application file for complete search history.

(56) References Cited

U.S. PATENT DOCUMENTS

| | | | |
|---|---|---|---|
| 7,117,191 B2 | 10/2006 | Gavan et al. | |
| 7,527,195 B2 | 5/2009 | Keithley | |
| 7,668,969 B1 * | 2/2010 | Kashyap | H04L 49/10 370/360 |
| 7,860,006 B1 * | 12/2010 | Kashyap | H04L 63/1416 702/182 |
| 8,645,250 B2 | 2/2014 | Boding | |
| 2004/0111645 A1 * | 6/2004 | Baffes | H04L 63/102 726/8 |
| 2008/0162202 A1 | 7/2008 | Khanna et al. | |
| 2010/0138345 A1 | 6/2010 | Lekhtman et al. | |
| 2011/0016052 A1 * | 1/2011 | Scragg | G06Q 20/02 705/44 |
| 2013/0218758 A1 | 8/2013 | Koenigsbrueck | |

(Continued)

FOREIGN PATENT DOCUMENTS

| JP | 2009-187143 A | 8/2009 |
|---|---|---|
| KR | 10-2009-0131114 A | 12/2009 |

OTHER PUBLICATIONS

U.S. Appl. No. 17/084,492, filed Oct. 29, 2020.
International Search Report and Written Opinion dated Feb. 26, 2013 in PCT/US2012/052893, 11 pages.

*Primary Examiner* — Kambiz Zand
*Assistant Examiner* — Aubrey H Wyszynski
(74) *Attorney, Agent, or Firm* — Kilpatrick Townsend & Stockton LLP

(57) ABSTRACT

Techniques managing access rules are provided. Access rules and their associated profiles are determined for evaluation. A triggering rate or a triggering percentage can be used to indicate efficacy of the rule. Recommendations can be provided based on a triggering percentage difference of the rule during a predetermined period of time. The recommendations can be provided in an interactive user interface.

20 Claims, 12 Drawing Sheets

(56) References Cited

U.S. PATENT DOCUMENTS

2015/0149610 A1\* 5/2015 Jhanb ..................... H04L 67/10
709/224

\* cited by examiner

Rule Janitor Report Period: 12/8/2019 - 1/8/2020

| Profile Name | Rule Name | Recommendation | Rule Date Created | Rule Date Modified | Rule Last Trigger Date | Trigger Rate (# of Trx) | Trigger Rate over period | # of Review | # of Unique Review | # of Unique Reviewer Reject | # of Unique Reviewer Accept | % of Unique Reviewer Accept | # of Unique Rejects | % of Unique Rejects | # of Unique MAS | % of Unique MAS |
|---|---|---|---|---|---|---|---|---|---|---|---|---|---|---|---|---|
| A: Digital Goods | Auth issues | Check | 1/6/2015 | 12/1/2019 | 1/1/2020 | 2 | -100.00% | 1 | 1 | 1 | 0 | 0.00% | | | 0 | 0.00% |
| | Low Dollar Microsoft Attack | Check | 5/6/2019 | 10/15/2019 | 1/2/2020 | 15 | 0.01% | 13 | 9 | 2 | 7 | 77.78% | | | 0 | 0.00% |
| | MS Office Fraud Ring 2 | Check | 5/22/2018 | 12/1/2019 | 1/1/2020 | 5 | 0.50% | 5 | 1 | 0 | 0 | 0.00% | | | 0 | 0.00% |
| A: High Dollar | Abnormal OS, email and Screen Res | Remove | 3/20/2014 | | | 0 | 0.00% | 0 | 0 | 0 | 0 | 0.00% | | | 0 | 0.00% |
| | Device FP: Time Zone Outside Cuntry's Time Zone | Check | 6/10/2017 | 12/1/2019 | 1/7/2019 | 39 | -7.00% | 24 | 5 | 1 | 4 | 80.00% | | | 0 | 0.00% |
| | CIF risky attributes | | 5/6/2019 | 10/15/2019 | 1/8/2020 | 425 | -4.00% | 345 | 133 | 2 | 130 | 97.74% | | | 3 | 2.26% |
| | Edit email, >$1500, MORPHR, Guest, WP > 400 | Check | 10/11/2018 | 9/10/2018 | 1/8/2018 | 12 | 2.00% | 9 | 0 | 0 | 0 | 0.00% | | | 0 | 0.00% |
| | Same Street ID with different DF & risky email | Check | 1/6/2015 | 12/1/2019 | 1/2/2020 | 56 | -20.00% | 50 | 28 | 4 | 24 | 85.71% | | | 2 | 7.14% |
| | Shipping to P.O. Box | Check | 9/23/2017 | 1/9/2018 | 1/1/2020 | 7 | 5.00% | 6 | 5 | 3 | 2 | 40.00% | | | 0 | 0.00% |
| | WP - Inputs <=3, Email first seen < 181 (R) | | 5/6/2019 | 12/1/2019 | 1/8/2020 | 631 | 2.00% | 553 | 178 | 18 | 160 | 89.89% | | | 11 | 6.18% |
| A: Low Dollar | Adobe | Check | 12/10/2019 | 10/15/2019 | 1/8/2019 | 176 | -10.00% | 23 | 2 | 2 | 0 | 100.00% | | | 0 | 0.00% |
| | Gift Card, New Account, WP > 300, FS > 20 | | 3/20/2014 | 9/10/2019 | 1/6/2019 | 6 | -25.00% | 6 | 6 | 6 | 0 | 100.00% | | | 0 | 0.00% |
| | House-home on ship to address | Check | 1/20/2020 | 12/1/2019 | 1/2/2020 | 78 | 0.20% | 35 | 12 | 12 | 0 | 0.00% | | | 12 | 100.00% |
| | Images & Javascript Disabled, Bill 2 <> Ship 2 | Remove | 10/23/2015 | 12/1/2019 | 1/1/2020 | 3 | 0.00% | 3 | 3 | 0 | 3 | 100.00% | | | 0 | 0.00% |
| | WP - City >=2 Risky Behavior, <161 email | | 5/6/2019 | 1/6/2019 | 1/8/2020 | 224 | -1.00% | 169 | 109 | 39 | 70 | 64.22% | | | 31 | 28.44% |
| | WP - City >=2 Risky Behavior, EN<>BN | | 5/18/2016 | 1/9/2019 | 1/8/2020 | 167 | -20.00% | 157 | 138 | 1 | 137 | 99.28% | | | 0 | 0.00% |
| | WP - Same Day Ships, EN<>BN | Check | 1/6/2015 | 12/1/2019 | 1/2/2020 | 86 | 5.00% | 86 | 88 | 2 | 86 | 97.06% | | | 1 | 1.47% |
| | WP - Smart(Dw/diff)DF risky email, <180 email | | 2/6/2018 | 1/9/2019 | 1/8/2020 | 193 | 31.00% | 149 | 37 | 23 | 14 | 37.84% | | | 18 | 48.65% |
| | WP - Smart(Dw/diff)DF risky email, <=3 inputs | | 5/6/2019 | 9/10/2019 | 1/8/2020 | 916 | 5.00% | 875 | 624 | 19 | 605 | 96.96% | | | 7 | 1.12% |
| | WP - Smart(Dw/diff)DF risky email,BN<>EN | Check | 3/1/2014 | 1/8/2015 | 1/7/2020 | 85 | 2.00% | 82 | 13 | 0 | 13 | 100.00% | | | 0 | 0.00% |
| | WP > 100, AFS > 25, Gmail, Bill Add = Ship Add | Remove | 3/20/2014 | | | 0 | 0.00% | 0 | 0 | 0 | 0 | 0.00% | | | 0 | 0.00% |
| A: Public Standard Risk | 2+ EM, 3+ CC, Same Shipping Name 1 Week | | 1/6/2015 | 9/10/2019 | 1/8/2020 | 635 | -3.00% | 534 | 394 | 8 | 386 | 97.97% | | | 2 | 0.51% |
| | -Bill <> Ship IP <> Bill City, Free Email, >200 WP | | 9/11/2018 | 10/15/2019 | 1/8/2020 | 2752 | 25.00% | 2491 | 1138 | 109 | 1019 | 89.54% | | | 15 | 1.32% |
| | -MM/PBC, Free-EM, VEL-NAME | | 5/6/2019 | 9/10/2019 | 1/9/2020 | 1901 | 6.00% | 1463 | 533 | 33 | 490 | 93.06% | | | 11 | 2.06% |
| | AMEX AVS match, MM-A, guest, WP score > 150 | | 12/15/2019 | 12/1/2019 | 1/8/2020 | 488 | 2.00% | 426 | 212 | 3 | 209 | 98.58% | | | 1 | 0.47% |
| | ANON-OS MM-2 VEL-CC, WPF > 199 | | 1/8/2015 | 9/10/2019 | 1/8/2020 | 856 | 3.00% | 535 | 167 | 16 | 151 | 90.42% | | | 3 | 1.89% |
| | AVS NO match Non Amex Cards only 1 | Check | 8/16/2019 | 10/15/2019 | 1/6/2019 | 66 | -3.00% | 0 | 0 | 0 | 0 | 0.00% | | | 0 | 0.00% |
| | AVS NO match Non Amex Cards only (complementary 2) | | 3/20/2014 | 1/6/2019 | 1/8/2020 | 2266 | 19.00% | | | | 0 | 0.00% | | | 0 | 0.00% |
| | AVS Partial match Amex only | | 7/24/2017 | 1/8/2019 | 1/7/2019 | 621 | 2.00% | 232 | 134 | 13 | 120 | 89.55% | | | 3 | 2.24% |
| | Barclay Trend, Guest, WP > 350, Email seen < 30 | | 1/6/2015 | | | 0 | 0.00% | 0 | 0 | 0 | 0 | 0.00% | | | 0 | 0.00% |
| | Credit Card Morphing | Remove | 6/6/2016 | 1/6/2019 | 1/8/2020 | 291 | 12.00% | 209 | 46 | 3 | 43 | 93.48% | | | 0 | 0.00% |
| | CVN not supported by cardholder's bank | Check | 5/8/2019 | 10/15/2019 | 1/11/2020 | 11 | -25.00% | 1 | 1 | 0 | 1 | 100.00% | | | 0 | 0.00% |

ACCESS RULE MANAGEMENT

BACKGROUND

Resource providers may generate rules that are applied to access requests. The rules can, for example, prevent fraudulent access from occurring. Over time, the resource provider may generate hundreds or thousands of rules. For example, a rule can be generated for each type of fraudulent access request.

Over time, the rules that were generated may no longer be applicable to the resource provider or to access requests made by users of the resource provider. For example, a type of fraudulent access request may no longer exist or rarely occurs. Resource providers are reluctant to remove rules, as they worry it could have a negative impact on their business. Further, resource providers may be reluctant to remove rules since they cannot readily determine the function of each of the rules. It could take a significant amount of time for the resource provider to determine whether a rule is still applicable. This time is multiplied given the hundreds of rules that may exist in the system of a resource provider.

However, resource providers are wary of removing rules. They may end up removing rules that are needed and/or applicable to current access requests. It can also be difficult to determine which rules should be maintained and which rules should be removed. Further, it may be unclear if some rules perform a same task.

As a result, the number of rules and rule profiles proliferates and can become unwieldly and difficult to manage. It can be difficult and time consuming for the resource provider to determine which rules are being used, rarely used, or if rules overlap.

The rules can also use excessive storage. The number of rules created and stored by a resource provider may be close to or more than a maximum allowable number of rules that can be handled by the decision management system. Further, it could take an excessive amount of user and processor time to check whether a rule is still applicable.

Therefore, checking whether a rule is still being used can be a drain on computing resources and other resources. Due to the difficulty of determining which rules are not being used, the resource provider will continue to maintain the rules in their system resulting in many inefficiencies.

Example embodiments of the disclosure address these and other problems, individually and collectively.

BRIEF SUMMARY

Example embodiments provide techniques for determining used or rarely used rules in a decision management system. Specifically, example embodiments provide systems and methods for identifying unused or rarely used rules in the decision management system.

A resource provider may start with a few profiles, each having only a few rules. But, over time, a resource provider generally add rules for specific cyberattacks (e.g., certain types of fraud). A resource provider is reluctant to remove rules, as they worry it could have a negative impact on their business. As a result, the number of rules and rule profiles proliferates and can become unwieldly. The rules can use excessive storage and processor time to check. The number of rules may even approach a maximum allowable number of rules that can be handled by the decision management system. Therefore, an example embodiment provides a system and method for managing rules.

Example embodiments provide systems, methods and computer readable media with can manage rules in an access server. A janitor computer can track which rules are triggered. The rules can be tracked on a daily, hourly, weekly, monthly, yearly, etc. basis. The triggering of the rules can be analyzed over time. For example, each time that a rule is triggered (which can be measured on a per profile basis), a counter for that rule can be incremented. The counters for each rule can be saved each day (or other time period), where a counter corresponds to a firing (triggering) rate. The counter can be used to determine whether a rule should be removed.

Alternatively, triggering percentage rates can be used to determine whether a rule should be removed. The firing rate or triggering rate of a rule can be analyzed over time to determine if the firing rate decreases by a specified amount, e.g., by a sufficient percentage from some initial firing rate. The time analysis can be over a given time window, which can be sliding.

Therefore, example embodiments provide systems, methods and computer readable media with can manage rules in an access server. A janitor computer can track which rules are triggered. The rules can be tracked on a daily, hourly, weekly, monthly, yearly, etc. basis.

Other embodiments are directed to systems, devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which:

FIG. 8 illustrates a report generator interface, in accordance with some example embodiments.

FIG. 9 illustrates a report generated by the janitor computer, in accordance with some example embodiments.

TERMS

Figure 1:
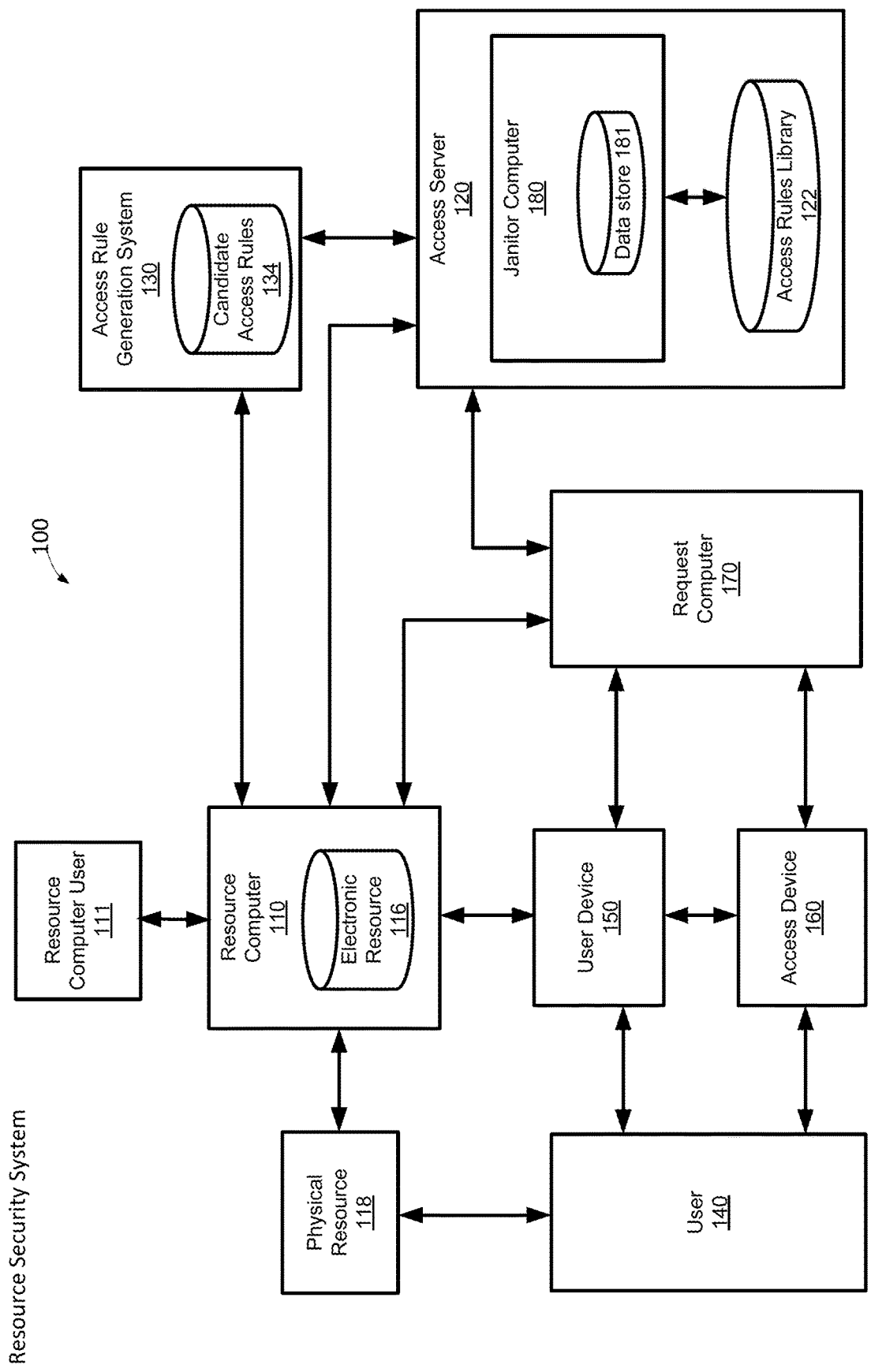
FIG. 1 shows a resource security system for authorizing access to resources, in accordance with some example embodiments.

Prior to discussing the details of some embodiments of the present disclosure, description of some terms may be helpful in understanding the various embodiments.

An "access device" may be any suitable device that provides access to a remote system. An access device may also be used for communicating with a resource provider computer, an authorizing computer, or any other suitable system. An access device may generally be located in any suitable location, such as at the location of a resource provider or merchant. An access device may be in any suitable form. Some examples of access devices include POS or point of sale devices (e.g., POS terminals), cellular phones, PDAs, personal computers (PCs), table PCs, handheld specialized readers, set-top boxes, electronic cash registers (ECRs), automated teller machines (ATMs), virtual cash registers (VCRs), kiosks, security systems, access systems, terminals, and the like. An access device may use any suitable contact or contactless mode of operation to send or receive data from, or associated with, a user communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. Other examples of access devices include devices (e.g., locks, gates, access control boxes, etc.) that control physical access to locations (e.g., venues, transit stations, homes, offices, buildings, etc.) as well as software devices that control access to data or information. In embodiments, the access device may be configured to charge or recharge a user device via contact or contactless modes of operation.

The term "access request" generally refers to a request to access a resource. The access request may be received from a requesting computer, a user device, or a resource computer, for example. The access request may include authorization information, such as a user name, account number, or password. The access request may also include and access request parameters, such as an access request identifier, a resource identifier, a timestamp, a date, a device or computer identifier, a geo-location, or any other suitable information. The access requests can be received in real time.

The term "access rule" may include any procedure or definition used to determine an access rule outcome for an access request based on certain criteria. In some embodiments, the rule may comprise one or more rule conditions and an associated rule outcome. A "rule condition" may specify a logical expression describing the circumstances under which the outcome is determined for the rule. A condition of the access rule may be involved by an access request parameter based on the parameter having a specific parameter value, based on the parameter value being within a certain range, based on the parameter value being above or below a threshold, or any combination thereof.

An "access rule outcome" of an access rule may represent an outcome determined by that rule based on one or more conditions of the rule and the parameters of the access request. For example, an access rule may provide an access rule outcome of either "reject," "accept," or "review," when its conditions are involved by an access request.

The term "access request outcome" may include any determination of whether to grant access to the resource. The access request outcomes may include "accept," "reject," or "review." In some embodiments, an access request outcome for an access request may be "reject" if any of the access rules have an access rule outcome of "reject." In some embodiments, an access request outcome for an access request may be "accept" if any of the access rules have an access rule outcome of "accept," regardless of any outcome being "reject." An access request outcome of "accept" may cause the access request to be granted. An access request outcome of "reject" may cause the access request to be denied. The "review" outcome may initiate a review process for the access request. In various embodiments, other outcomes or other meanings of these outcomes may be used.

"Authentication" or "authenticating" may be the process of proving or verifying certain information, and/or verifying the identity of the source of that information. For example, a user may provide authentication data that is unique or only known to the user to prove the identity of the user. Examples of different types of authentication data may include biometrics (e.g., fingerprint, palm print, face recognition, iris and/or retina recognition, voice recognition, gait, or other human characteristics), passcode, PIN, answers to security question(s), cryptographic response to challenge, human and/or device signature, etc.

An "authorization request message" may be an electronic message that requests authorization for an interaction. In some embodiments, an authorization request message can be sent to an authorization computer and/or an issuer of a payment card to request authorization for a transaction. According to some embodiments, an authorization request message may comply with ISO 8583, a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" or "user information" including, by way of example only: a service code, a CVV (card verification value), a dCVV (dynamic card verification value), a PAN (primary account number or "account number"), an access token, a user identifier (e.g., user name), an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in identifying and/or determining whether to authorize a transaction.

An "authorization response message" may be a message that responds to an authorization request. In some cases, it may be an electronic message reply to an authorization request message generated by an issuing financial institution or an authorization computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" is an entity that can authorize or approve interactions. An authorizing entity may typically refer to a business entity (e.g., a bank) that maintains an account for a user and is capable of authorizing interactions such as the purchase of goods or services from a merchant. An authorizing entity may operate an "authorization computer." Examples of an authorization entity may be an issuer, a governmental agency, a document repository, an access administrator, etc. An "issuer" may typically refer to a business entity (e.g., a bank) that maintains an account for a user that is associated with a client device such as an account enrolled in a mobile application installed on a client device. An authorization entity may also issue account parameters associated with the account to a client device. An authorization entity may be associated with a host system that performs some or all of the functions of the issuer on behalf of the authorization entity. In embodiments, the authorization computer may maintain a trusted clock for providing the time stamp information to user devices during manufacture or during personalization with a user.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "profile" may refer to identifying information for different types of transactions. Different types of transactions can include different profiles. Further, profiles can include one or more rules that are associated with the profile. A profile name can correspond to a type of transaction that often occurs for resource providers.

The term "providing" may include sending, transmitting, making available on a web page, for downloading, through an application, displaying or rendering, or any other suitable method. In various embodiments of the invention, rule profiles, rule outcome frequencies, and rule outcome disposition frequencies may be provided in any suitable manner.

A "remote server computer" may include to a computer that is remotely located with respect to a client computer. In some embodiments, a remote server computer can be part of a payment processing network. A remote server computer can include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A "request processing system" can include one or more computers for processing payment. The request processing system can be, for example, a payment management system for electronic commerce.

A "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may include a good or service, a physical building, a computer account or file, or a payment account. In some embodiments, a resource may refer to a financial product, such as a loan or line of credit.

A "resource provider" may be an entity that can provide resources such as goods, services, information, and/or access. Examples of a resource provider includes merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

The term "transaction" may include an exchange or interaction between two entities. In some embodiments, a transaction may refer to a transfer of value between two users (e.g., individuals or entities). A transaction may involve the exchange of monetary funds, or the exchange of goods or services for monetary funds between two individuals or entities. In other embodiments, the transaction may be a purchase transaction involving an individual or entity purchasing goods or services from a merchant or other entity in exchange for monetary funds. In other embodiments, the transaction may be a non-financial transaction, such as exchanging of data or information between two entities, such as the transfer of data. Examples of non-financial transactions may include transactions verifying a user's age or identity (e.g., verifying identity with a government agency, verifying age for the purchase of alcohol) for access to a computer system or a venue.

A "user device" may be any suitable device that is operated by a user. Suitable user devices can be portable and can communicate with external entities such as access devices. Examples of user devices include cards that have data stored on them, access cards, smart cards, etc. A payment device may be an example of a user device.

DETAILED DESCRIPTION

Resource providers create profiles for different types of purchases. Profiles can include, for example, "Overnight shipping and greater than $1000," "Digital goods" "High Dollar" "Low Dollar," "Public Standard Risk," "Buy online, Store pickup greater than $300." etc. These are merely examples and many profiles for different types of purchases can be created. Profiles can vary per resource provider and can vary based on the types of resources provided by the resource provider.

For each of the profiles, one or more rules can be created. A rule can include parameters that when met, will trigger the rule. A rule can be generated specific to a particular type of fraud, such as a cyberattack, that the resource provider would like to prevent. For example, a profile of "digital codes" can include rules such as "Auth issues," "Low Dollar Attack" and "Fraud Reg 2." These are merely examples, and different rules can be created as desired by the user. Specifically, rules can be created based on the activity that the resource provider would like to identify.

A rule can be created that is used only for a particular profile or a rule can be created that is used among several different profiles. A library of rules can be created and a profile can include links to the rules. The library can include a varying number of rules depending on the user. For example, a library can include a hundred rules or a thousand rules. That is, a profile can be created that includes links to one or more rules that are stored in a rules library. Further, the results from the rule evaluation can be associated with or attached to the profile. Example profiles and rules associated with the profiles are shown in FIG. 9. FIG. 9 will be explained in greater detail below.

A particular rule may appear in different profiles. For example, Rule A may be used in a first profile and in a second profile. However, Rule A may not be triggered in both profiles. For example, Rule A may continue to trigger in the first profile, but not in the second profile. That is, Rule A continues to be relevant for the first profile, but not the second profile. Therefore, Rule A cannot be entirely removed. It can be very difficult to determine which rules should be removed for which profiles and which rules should remain in system since rule usage can vary from profile to profile.

Over time, the rules that are generated may no longer be needed as the type of fraudulent activity no longer exists. Alternatively, multiple rules may be used to address the same kind of fraudulent activity. Therefore, example embodiments provide techniques for determining which rules are not used or rarely used. Example embodiments can also provide recommendations for the rules. The user can be notified regarding the triggering rate of these rules and the user can then determine which rules they would like to remove, keep or update. Alternatively, the system can independently determine which rules should be removed, kept or updated from the system.

I. Resource Security System

A resource security system may be used to grant or deny access to resources. In addition, the resource security system may implement access rules to reject access requests having parameters indicative of fraud. For purposes of brevity, an access rule may also be called a rule in the description. The resource security system may evaluate the performance of the access rules based on reports of fraudulent access. The resource security system may determine whether the rules are used and whether the rules continue to be applicable to the system. If a rule is not used, then the resource security system can determine whether the rule should be removed from the system.

A resource security system may receive requests to access a resource. The resource security system may include an access server for determining an outcome for the access request based on access rules. The resource security system may also include an access rule generation system for generating and selecting the access rules. The resource security system is described in further detail below.

A. Resource Security System for Securing Access to a Resource

FIG. 1 shows a resource security system 100 for authorizing access to resources, in accordance with some example embodiments. The resource security system 100 may be used to provide authorized users access to a resource while denying access to unauthorized users. In addition, the resource security system 100 may be used to deny fraudulent access requests that appear to be legitimate access requests of authorized users. The resource security system 100 may implement access rules to identify fraudulent access requests based on parameters of the access request. The access rules may be selected based on their performance and their stability over time.

The resource security system 100 can include a resource computer 110. The resource computer 110 may control access to a physical resource 118, such as a building or a lockbox, or an electronic resource 116, such as a local computer account, digital files or documents, a network database, an email inbox, a payment account, or a website login. The resource computer 110 may be controlled by a resource computer user 111. In some embodiments, the resource computer may be a webserver, an email server, or a server of an account issuer. The resource computer 110 may receive an access request from a user 140 via a user device 150 (e.g., a computer or a mobile phone) of the user 140. The resource computer 110 may also receive the access request from the user 140 via a request computer 170 coupled with an access device 160 (e.g., a keypad or a terminal). The access request can be received in real time. In some embodiments, the request computer 170 may be a service provider that is different from the resource provider.

The access device 160 and the user device 150 may include a user input interface such as a keypad, a keyboard, a finger print reader, a retina scanner, any other type of biometric reader, a magnetic stripe reader, a chip card reader, a radio frequency identification reader, or a wireless or contactless communication interface, for example. The user 140 may input authorization information into the access device 160 or the user device 150 to access the resource. The authorization information may include one or more of a user name, an account number, a token, a password, a personal identification number, a signature, and a digital certificate, for example. In response to receiving authorization information input by the user 140, the user device 150 or the request computer 170 may send an access request to the resource computer 110 along with one or more parameters of the access request. The access request may include the authorization information provided by the user 140.

In one example, the user 140 may enter one or more of an account number, a personal identification number, and password into the access device 160, to request access to a physical resource (e.g., to open a locked security door in order to access a building or a lockbox) and the request computer 170 may generate and send an access request to the resource computer 110 to request access to the resource. In another example, the user 140 may operate the user device 150 to request that the resource computer 110 provide access to the electronic resource 116 (e.g., a website or a file) that is hosted by the resource computer 110. In another example, the user device 150 may send an access request (e.g., an email) to the resource computer 110 (e.g., an email server) in order to provide data to the electronic resource 116 (e.g., deliver the email to an inbox). In another example, the user 140 may provide an account number and/or a personal identification number to an access device 160 in order to request access to a resource (e.g., a payment account) for conducting a transaction.

In some embodiments, the resource computer 110 may verify the authorization information of the access request based on information stored at the request computer 170. In other embodiments, the request computer 170 may verify the authorization information of the access request based on information stored at the resource computer 110.

The resource computer 110 may receive the request substantially in real-time (e.g., account for delays computer processing and electronic communication). Once the access request is received, the resource computer 110 may determine parameters of the access request. In some embodiments, the parameters may be provided by the user device 150 or the request computer 170. For example, the parameters may include one or more of: a time that the access request was received, a day of the week that the access request was received, the source-location of the access request, the amount of resources requested, an identifier of the resource being request, an identifier of the user 140, the access device 160, the user device 150, the request computer 170, a location of the user 140, the access device 160, the user device 150, the request computer 170, an indication of when, where, or how the access request is received by the resource computer 110, an indication of when, where, or how the access request is sent by the user 140 or the user device 150, an indication of the requested use of the electronic resource 116 or the physical resource 118, and an indication of the type, status, amount, or form of the resource being requested. In other embodiments, the request computer 170 or the access server 120 may determine the parameters of the access request.

While the access request may include proper authentication information, the resource computer may send the parameters of the access request to the access server 120 in order to determine whether the access request is fraudulent. The access server 120 may store one or more access rules in an access rules library 122 for identifying a fraudulent access request. Each of the access rules in the access rules library 122 may include one or more conditions corresponding to one or more parameters of the access request.

The access server 120 may determine an access request outcome indicating whether the access request should be accepted (e.g., access to the resource granted), rejected (e.g., access to the resource denied), or reviewed by comparing the access rules in the access rules library 122 to the parameters of the access request as further described below. In some embodiments, instead of determining an access request outcome, the access server 120 may determine an evaluation score based on outcomes of the access rules. The evaluation score may indicate the risk or likelihood of the access require being fraudulent. If the evaluation score indicates that the access request is likely to be fraudulent, then the access server 120 may reject the access request.

The access server 120 may send the indication of the access request outcome to the resource computer 110 (e.g., accept, reject, or review). In some embodiments, the access server 120 may send the evaluation score to the resource computer 110 instead. The resource computer 110 may then grant or deny access to the resource based on the indication of the access request outcome or based on the evaluation score. The resource computer 110 may also initiate a review process for the access request.

In some embodiments, the access server 120 may be remotely accessed by a user. The access server 120 may store data in a secure environment and implement user privileges and user role management for accessing different types of stored data. For example, user privileges may be set to enable users to perform one or more of the following operations: view logs of received access request, view logs of access request outcomes, enable or disable the execution of the access rules in the access rules library 122, update or modify the access rules in the access rules library 122, change certain access request outcomes. Different privileges may be set for different users.

The resource computer 110 may store access request information for each access requests that it receives. The access request information may include the parameters of each of the access requests. The access request information may also include an indication of the access request outcome for the access request. The resource computer 110 may also store validity information corresponding to each access request. The validity information for an access request may be initially based on its access request outcome. The validity information may be updated based on whether the access request is reported to be fraudulent. In some embodiments, the access server 120 or the request computer 170 may store the access request information and the validity information.

The access server 120 may include a janitor computer 180. The janitor computer can be used to identify the rate of use of the access rules in the access rules library 122. The janitor computer can generate a report to assist a user in determining the usage rate of rules.

B. Janitor Computer

The resource security system 100 allows a resource provider to create rule profiles and specify criteria for when a specific rule profile is to be selected. Once a rule profile is selected for a given transaction, each of the specific access rules within the profile may or may not be triggered based on the particular transaction data. Based on which access rules of the profile are triggered, the user can decide to accept/keep, delete/remove or update/check a rule.

The access rules in access rules library 122 can be implemented by the access server 120 and may be generated by an access rule generation system 130. The access rule generation system 130 may generate candidate access rules 134 for the access server 120 based on the access request information and the validity information. The access rule generation system 130 may receive the access request information and the validity information corresponding to the access request information from the resource computer 110 or the access server 120. The access rules in the access rules library 122 implemented by the access server 120 may include some or all of the candidate access rules 134. An access rule can be re-used among rule profiles.

The janitor computer 180 can determine whether the access rules 122 continue to be used by the resource security system 100. The janitor computer 180 is a computer that includes a processor and a memory. The janitor computer 180 is configured to perform real-time processing of the access rules. The janitor computer can provide a report to the resource computer 110. The report can be presented on a display of a user interface. A user, such as the resource computer user 111, can determine whether the access rule should be maintained in the resource security system 100. The report can also be known as an efficacy report since it identifies the efficacy or effectiveness of rules.

The janitor computer 180 can include a data store 181 for storing data, such as profile information, for evaluation. The data store 181 can also store rule information, such as links to rules that are stored in the access rules library 122.

Figure 2:
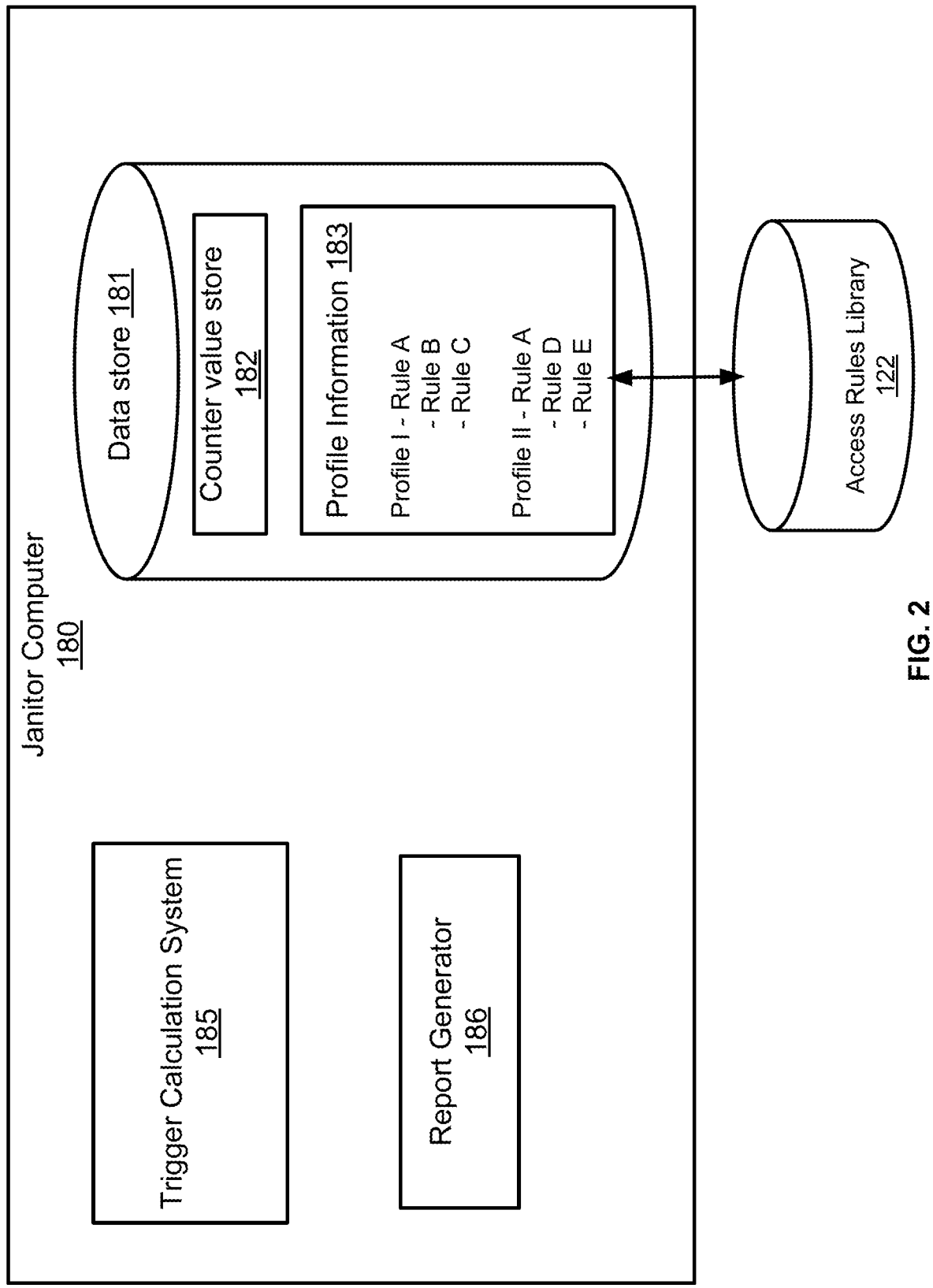
FIG. 2 shows a functional block diagram of the janitor computer, in accordance with some example embodiments.

FIG. 2 shows a functional block diagram of the janitor computer 180, in accordance with some example embodiments.

As shown in FIG. 2, the janitor computer 180 can include a data store 181, a trigger calculation system 185 and a report generator 186. The data store 181 can store a counter value store 182 and profile information 183. The data store 181 can access rules that are obtained from the access rules library 122. For example, the data store 181 can store links to access rules that are stored in the access rules library 122 or other information that identifies the access rules.

A rule can route you to the associated profile. In the example shown in FIG. 2, Rule A is associated with Profile I and Profile II. Therefore, when Rule A is being evaluated, Rule A can be evaluated for both Profile I and Profile II. Alternatively, Rule A could be evaluated for only a single profile if the user wants to evaluate Rule A for only a particular profile and not for all of the profiles in which Rule A is associated with. Rules B and C only occur in Profile I and rules D and E only occur in Profile II. Therefore, if Rule B was being evaluated, it would only be evaluated with respect to profile I. Further, if Rule E was being evaluated, it would only be evaluated with respect to Profile II.

The trigger calculation system 185 can be used to determine whether a rule in a profile continues to be triggered. The trigger calculation system 185 is explained in more detail with respect to FIG. 4.

The report generator 186 can generate a report for the one or more rules in one or more profiles. The report that is generated can vary based on the data desired by the user. A report that can be generated by the report generator 186 is explained in greater detail with respect to FIG. 9. The report can be used by the user to easily and quickly determine whether or not a rule should be removed from a profile and whether a profile associated with the rules should also be removed. A profile can be removed when none of the rules associated with the profile are being triggered.

The report can be provided on an interactive user interface. Therefore, the user can easily manipulate the report results. That is, a user can quickly and easily identify rules that should be removed. Further, the rules can be removed in an efficient manner. For example, the user can select the rule (e.g., select a checkbox associated with the rule), and easily mark the rule for deletion. The one or more rules selected for removal can be easily removed from the system. The user can also easily sort and filter through the results.

A plurality of access rules can be stored in the access rules library 122. Each of the plurality of access rules can include one or more parameters for triggering each of the access rules. The resource provider, for example, can create the access rules library 122 and rules in the library can be reused for different profiles.

II. Method For Managing Access Rules

Figure 3:
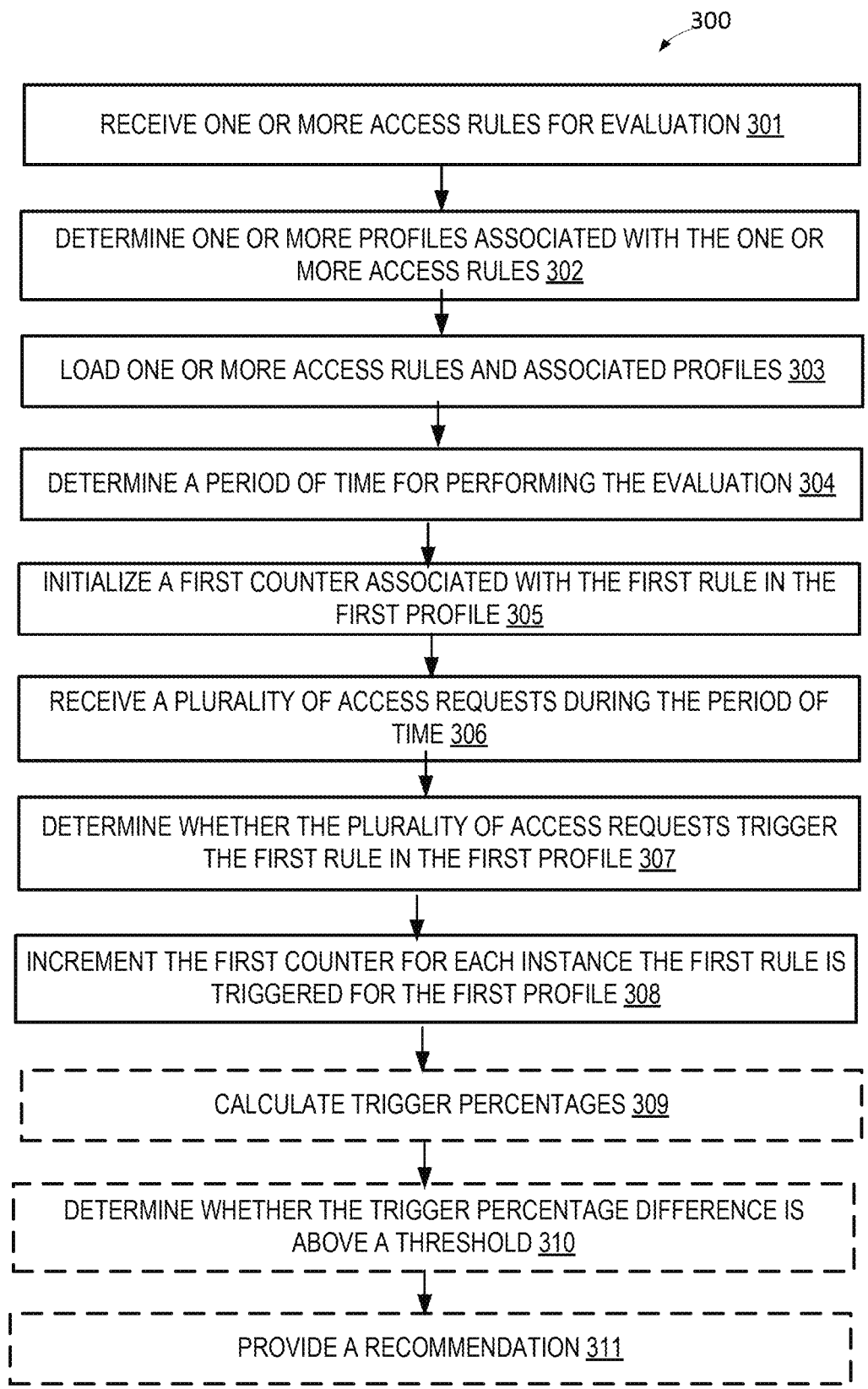
FIG. 3 illustrates a flowchart of a method for managing access rules, in accordance with some example embodiments.

FIG. 3 illustrates a flowchart of a method 300 for managing access rules, in accordance with some example embodiments.

At step 301, a first access rule from the plurality of access rules is received for evaluation. For example, a user may indicate that they would like to evaluate Rule A. The access rule for evaluation can be provided by the access server. For purposes of example, the evaluation of one rule is discussed. However, at a given time, many rules can be evaluated. A user can select a rule for evaluation via a user interface. The rule to be evaluated can be input by the user on a user interface.

At step 302, a first profile that includes the access rule is determined. For example, the janitor computer can determine that Profile I contains Rule A. The incoming rule is streamed to its associated profile. The janitor computer can identify a profile associated with the rule. Therefore, an example embodiment operates in a hierarchical manner. At the top, a rule or a set of rules is identified for evaluation and the one or more rules are routed to the appropriate profile. The rules within each of the profiles are then evaluated.

One or more profiles can be identified for a single rule. A single rule that is being evaluated can be associated with a plurality of profiles. A profile can correspond to, for example, a type of transaction that can occur for a resource provider. For ease of explanation, the rule is associated with one profile. However, a rule can often be associated with many profiles, and the rule would be evaluated for each of the profiles. A rule evaluation result will be provided for each rule and profile combination.

At step 303, the rule that is being evaluated and the associated profile are loaded into a memory of the janitor computer for evaluation. The rule and profile information can be loaded into the data store 181.

As shown in FIG. 2, Profile I includes three access rules (A, B and C) and Profile II includes three access rules (A, D, and E). These access rules and their associated profiles can be loaded in the data store 181 when they are being evaluated. The rules do not need to be directly stored in the data store 181. Alternatively, the rules can be stored in the access rules library 122 and link information to an access rule can be stored in the data store 181. Therefore, the rule information can be linked and not necessarily stored in the data store 181.

At step 304, a period of time for performing the evaluation is received. For example, a user may indicate that they would like to evaluate the rule for 12 weeks. 12 weeks is merely used for an example and the evaluation can be performed for hours, days, weeks, months, etc., depending on the needs of the user. The time period for evaluating the rule can vary based on the frequency that the rule is triggered. The janitor computer can also suggest a period of time for performing the evaluation based on the amount of data that is available.

The user can be prompted to input a period of time for which they would like to test the identified rule. The user can select a period of time using, for example, a calendar input. Alternatively, the janitor computer can identify a period of time for which the first rule is evaluated. The period of time can be a predetermined period of time or the period of time can be identified by the user of the rules janitor computer.

At step 305, a counter that is associated with the first access rule for the first profile is initialized. A counter can be initialized for each rule and profile combination. For example, Rule A for Profile I can have one counter, and Rule A for Profile II can have a separate counter. The counter information can be stored in counter value store 182. The counter will be used to track the triggering of the first access rule in the first profile during the determined period of time. The counter value can be incremented each time the first rule is triggered in the first profile during the determined period of time. A different counter would be created and stored for the same rule in a different profile since the triggering rate for a rule in a first profile can be different for the rule in a second profile.

At step 306, a plurality of access requests are received during the determined period of time for performing the evaluation. The access requests are based on transactions made by, for example, customers of a resource provider. The number of transactions that are performed can vary. For example, there may be at least 1,000, 10,000, 100,000, and 1,000,000 transaction per hour, per day, or per week. The number of transactions can vary based on the type of transaction or based on a type of resource.

The janitor computer can receive one or more transactions during the identified period of time. The one or more transactions can be transactions conducted with the resource provider in real-time, or the one or more transactions can be provided to the rules janitor computer for purposes of testing the rule.

At step 307, it is determined whether any of the received access requests trigger the first access rule in the first profile. A rule is triggered when the rule parameters are met. The rules are created to identify a particular fraudulent transaction.

The janitor computer can determine, based on the plurality of transactions that are received, whether or not the rule that is being evaluated is being triggered during identified period of time. If the rule is not triggering, then it is not being used to identify fraudulent transactions.

At step 308, the counter value for the first rule of the first profile is incremented for each instance that the first access rule is triggered by an access request. The counter value will continue to be incremented each time the first rule of the first profile is triggered during the determined period of time.

In an example embodiment, the counter value alone can be used to determine whether the access rule is being triggered above a predetermined threshold. For example, if the counter value, such as a number indicating a quantity of times that the access rule has been triggered, is below a predetermined threshold, the janitor computer 180 can determine that the access rule is not being used.

The janitor computer can generate a report indicating that the access rule is not being used above the predetermined threshold. Therefore, based on the counter value, the janitor computer 180 can generate a report notifying the user that the access rule may need to be removed or updated. Alternatively, the janitor computer 180 can automatically remove the access rule from the access rules that are stored in the access server library if the access rules are not being used above a predetermined threshold.

Although a counter value can be a good indicator regarding whether a rule is being triggered, more accurate results can be received by calculating triggering percentages. Therefore, in an example embodiment, the counter value is used to calculate trigger percentages for the access rule over time.

At step 309, a trigger percentages and a difference between trigger percentages can be calculated for the first access rule in the first profile based on the counter values of the first access rule of the first profile during the determined period of time. The trigger percentages can be calculated by a trigger calculation system 185. The calculated first trigger percentage can be stored in the data store 181. Step 309 is explained in greater detail with respect to FIG. 4 below.

After the trigger percentages are calculated, at step 310, the janitor computer can determine whether trigger percentage difference is above a threshold.

The janitor computer can analyze the trigger percentage difference to determine whether the different is above a designated threshold. The threshold to be a predetermined threshold or can be a threshold designated by user of the rules janitor. The statistical significance is used as an indicator as to whether the rule should be removed, updated or kept as is.

At step 311, a recommendation can be provided to the user. The recommendation can be in the form of a report that is displayed on a user interface. The recommendation can flag certain rules that should be reviewed by the user.

A report can be generated after the rule janitor has been applied to the identified rules for the identified period of time. The report can be provided on a user interface. The report can indicate which rules for each profile may need to be adjusted or removed completely. Once the user has the report, the user would be able to easily see the performance of the rules.

All of the profiles that are identified for an access rule can be analyzed with respect to the first access rule. Further, the first rule that is analyzed for a first profile may have a different result than when the first rule is analyzed for a second profile. When the first rule is analyzed for the first profile, the outcome of the analysis may be "delete." When the first rule is analyzed for the second profile, the outcome of the analysis may be "keep". Therefore, a rule is analyzed separately for each profile.

The results of evaluating a rule can vary according to the profile. For example, in a first profile, the rule can continue to be triggered throughout the period for evaluation. Whereas the same rule in a second profile, may not be triggered at all during the period for evaluation. A separate counter would be provided for each rule per profile. The outcome for a particular rule and profile combination can be attached to the profile.

Trends would be evaluated to determine if triggering of rule is tailing off or is no longer being triggered. After the rule is evaluated, the user determine whether the rule should be written or if the rule should be maintained in the system. Alternatively, the janitor computer can automatically identify whether the rule should be removed or if the rule should be maintained in the system. The determination as to whether or not the rule should be removed can be based on parameters that are identified by the user, or based on parameters that are identified by janitor computer based on a history of the rules that are applied.

III. Trigger Calculation System

Figure 4:
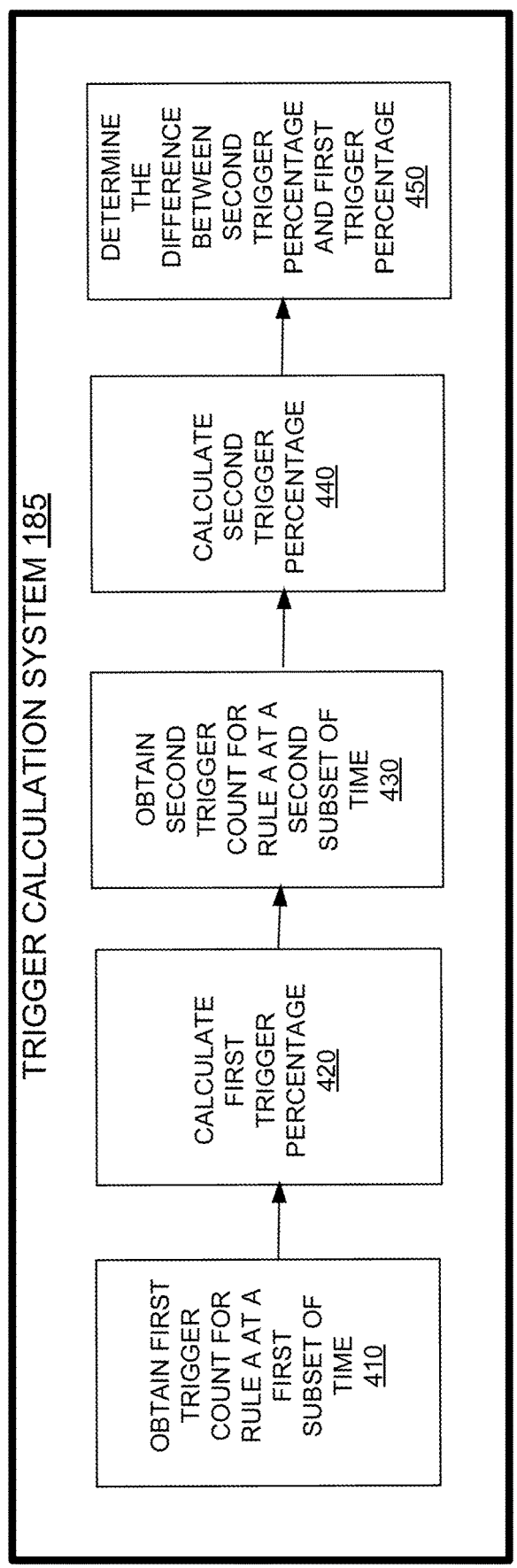
FIG. 4 illustrates a flow diagram for a trigger calculation system, in accordance with some example embodiments.

FIG. 4 illustrates a flow diagram for a trigger calculation system 185, in accordance with some example embodiments.

At step 410, the trigger calculation system 185 can obtain a first trigger count for the first rule of the first profile during a first subset of the time period. The first subset of the time period can be, for example, week one of the 12 week period of time during which the first rule is being evaluated. The first subset of time corresponds to a subset of the period of time that was determined at step 304 of FIG. 3.

At step 420, a trigger percentage for the first subset of time (e.g., week one) is calculated. The first trigger percentage can be calculated based on the number of times the rule is triggered with respect to the number of access requests during the first subset of time.

At step 430, a second trigger count can be obtained for the first rule of the first profile at a second subset of time. The second subset of time can be, for example, week 2 of the time period being evaluated. Therefore, the second subset of time occurs after the first subset of time.

At step 440, a second trigger percentage is calculated for the second trigger count. The second trigger percentage can be calculated based on the number of times the rule is triggered with respect to the number of access requests during the second subset of time.

At step 450, a trigger percentage difference is calculated between the second trigger percentage and the first trigger percentage. The calculated trigger percentages can be stored in the data store 181. The trigger percentage can be used to determine whether the rule should be kept, removed, or updated.

Figure 5A:
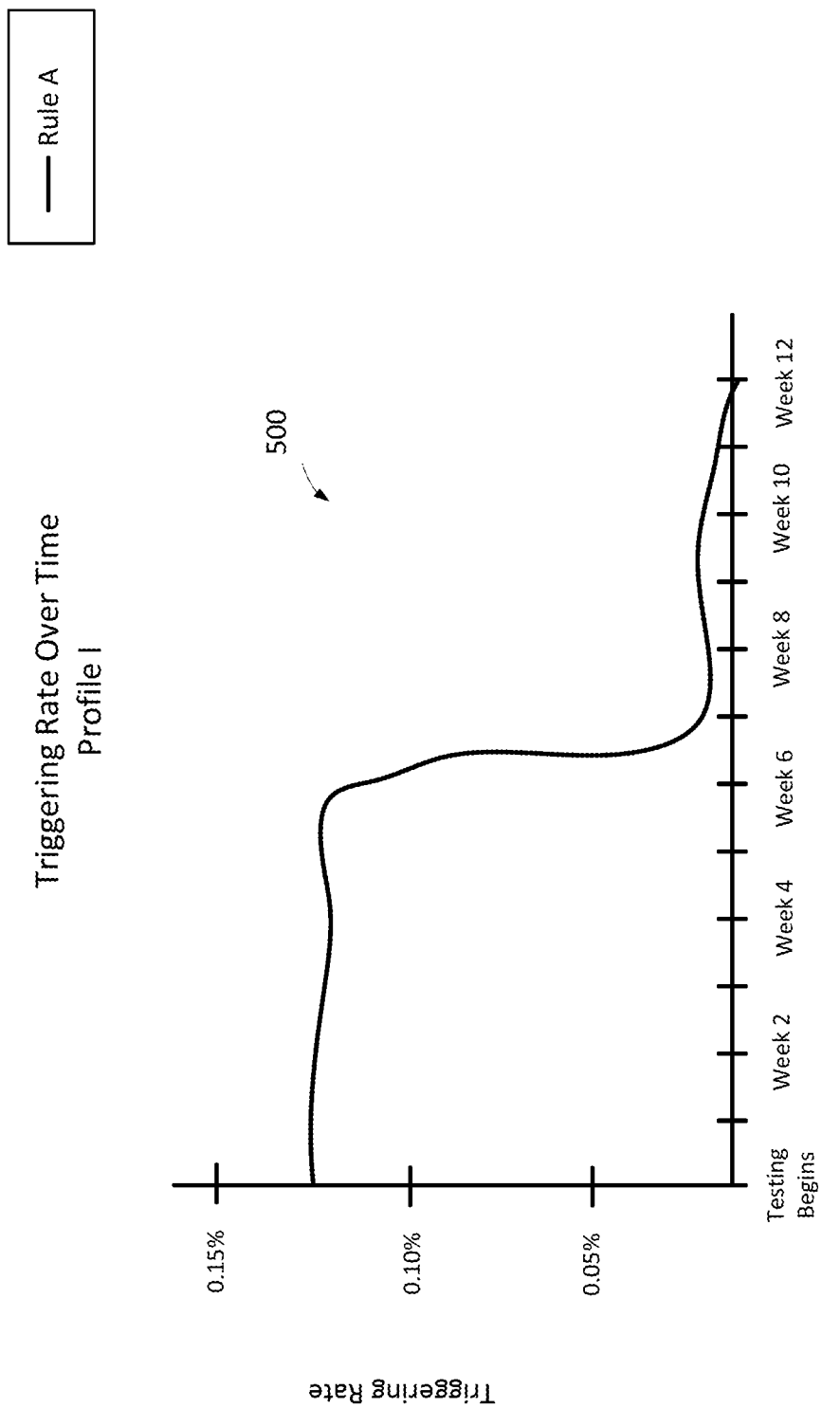
FIGS. 5A and 5B illustrate exemplary graphs of triggering percentages for an access rule over time, in accordance with some embodiments.
Figure 5B:
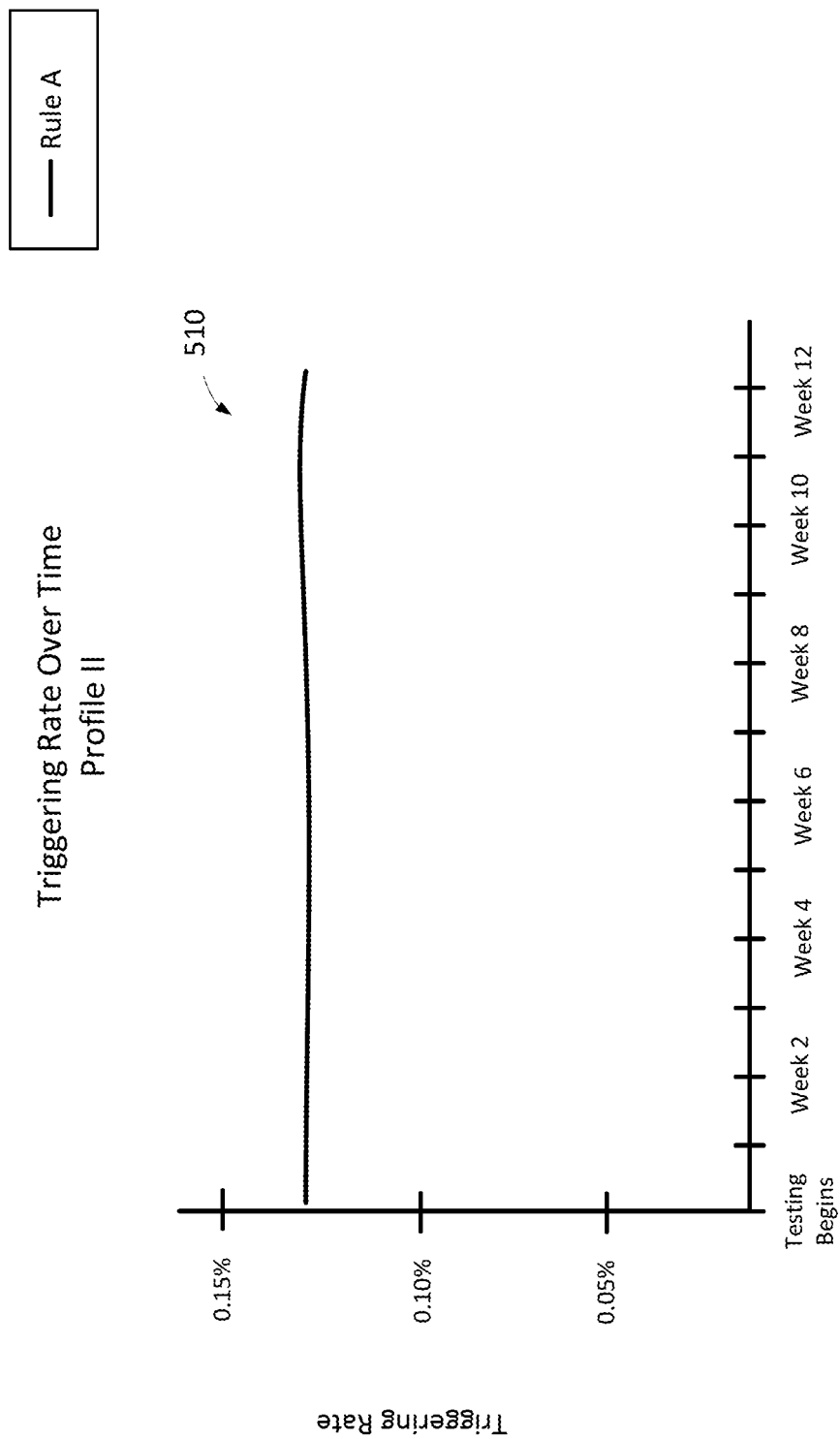

FIGS. 5A and 5B illustrate exemplary graphs of triggering percentages for an access rule over time, in accordance with some embodiments.

FIG. 5A illustrates a graph 500 including the triggering percentage for Rule A in Profile I during a 12 week period of time. 12 weeks is merely an example and the time period for performing the analysis can vary as desired by user. The triggering percentage can be calculated in real-time. That is, the triggering percentage is calculated as access requests are received.

As shown in FIG. 5A, at week 1, the triggering percentage is about 13%. At week 7, the triggering percentage of Rule A in Profile I is at about 1%. The difference is calculated between the two triggering percentages. In this example, the difference between the second trigger percentage and the first trigger percentage would be about 12%. It is then determined whether this difference is statistically significant. The statistical significance can be determined based on a threshold that is set by the user. For example, if the threshold that is set by the user is 5%, then a 12% difference would be considered statistically significant and rule should be removed.

As shown in FIG. 5A, by week 6, the triggering of Rule A decreases. In weeks 7 through 12, the triggering percentage of rule A greatly decreases compared to the triggering percentage of rule A in weeks 1 through 6. The decrease in the triggering percentage can indicate that rule A is not effective for Profile I. Therefore, in the example shown in FIG. 5A, the janitor computer may recommend that the rule be "removed" or "checked." Checking the rule can include modifying or updating the rules so that it can be applicable to Profile I. The triggering results can be stored on the data store of the janitor computer for a predetermined period of time. The triggering results for the rule can be stored for each profile.

FIG. 5B illustrates a graph 510 including the triggering percentage for Rule A in Profile II during a 12 week period of time. As shown in FIG. 5B, at week 1, the triggering percentage is about 13%. At week 7, the triggering percentage of Rule A in Profile I continues to be at about 13%. The difference is calculated between the two triggering percentages. In this example, the difference would be about 0%. It is then determined whether this difference is statistically significant. The statistical significance can be determined based on a threshold that is set by the user. For example, if the threshold that is set by the user is 5%, then the 0% difference would be considered not statistically significant and rule should be maintained.

In the example shown in FIG. 5B, the janitor computer may determine that access rule A continues to be applicable to Profile II. The stability in the triggering percentage can indicate that Rule A continues to be effective for Profile II. In the case where the access rule continues to be applicable, the janitor computer may not provide a suggested action for access Rule A in Profile II and it can be assumed that the rule should be kept in the profile. Alternatively, the janitor computer may provide an indication that access rule a given Profile II can be kept or maintained. The triggering results can be stored on the data store of the janitor computer for a predetermined period of time. The triggering results for the rule can be stored for each profile.

FIGS. 5A and 5B are merely examples and the triggering percentages of access rules are not often visibly apparent.

In the example shown in FIGS. 5A and 5B, a 12 week time period is used to calculate the triggering percentages. However, the time period for evaluating the triggering percentages can be a moving window. For example, a triggering percentage can be calculated for week 13. A difference between the triggering percentage for week 13 and week 12 can be used to calculate a statistical significance of the rule. That is, the time period for evaluation can continue to change while the rule is kept in resource security system.

IV. Updating Access Rules

Figure 6:
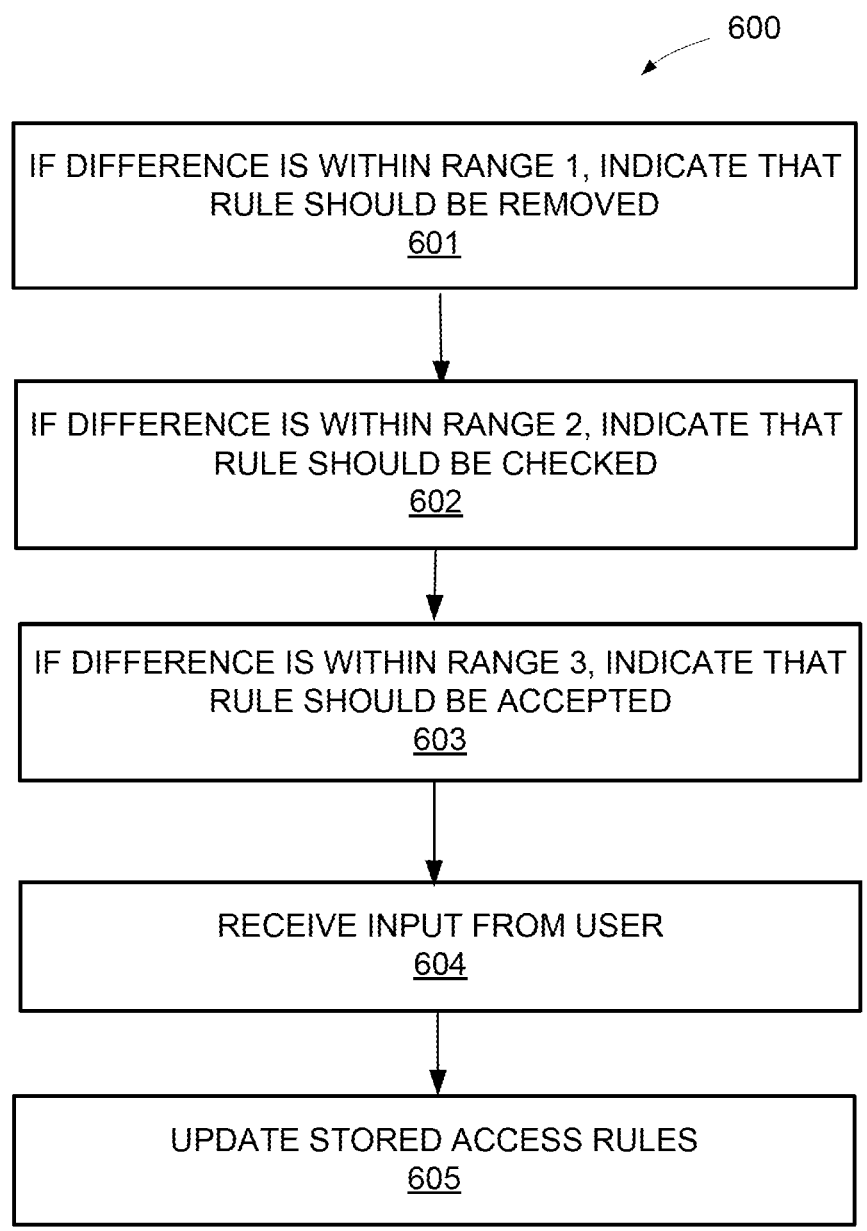
FIG. 6 illustrates a flowchart of a method for generating a rule janitor report, in accordance with some example embodiments.

FIG. 6 illustrates a flowchart of a method 600 for generating a rule janitor report in order to manage rules, in accordance with some example embodiments.

At step 601, it is determined whether the difference between the first trigger percentage and the second trigger percentage is within a first range. If the difference is within the first range, the report can indicate that the rule should be removed. The report can provide a flag next to rules that should revert removed so that the user can easily identify rules to remove. The first rage can indicate that there is a large statistical difference between the first trigger percentage and the second trigger percentage. The range can be determined based on historical data. If the difference is not within the first range, then the method proceeds to step 602.

At step 602, it is determined whether the difference between the first trigger percentage and the second trigger percentage is within a second range. If the difference is within the second range, the report can indicate that the rule should be updated. The second range can be range value that is less than the first range. The second range can indicate that there is a notable statistical difference. If the difference is not within the second range, then the method proceeds to step 603.

At step 603, it is determined whether the difference between the first trigger percentage and the second trigger percentage is within a third range. The third range can be range value that is less than the second range. That is, the third rage can indicate that there is little statistical difference. If the difference is within the third range, the report can indicate that the rule should be kept as it is.

At step 604, the user can input on the user interface displaying the report, whether they would like to delete, keep or check a rule.

At step 605, based on the input made by the user, the access rules that are stored in the access rules library 122 can be updated. Rules can be removed as needed. If the user determines that the rule should be removed, the user can, for example, select a checkbox associated with the specific rule and specific profile. Selection of the checkbox can indicate that the user would like to remove the rule. However, this is merely an example and alternative methods of selecting the rules for removal can be used. A select all checkbox can be provided if the user would like to remove all of the rules for all of the profiles that are being tested.

The report can also be export to another document, such as Excel, or be attached in an email for further analysis as needed.

V. User Interface For Report Generation

Figure 7:
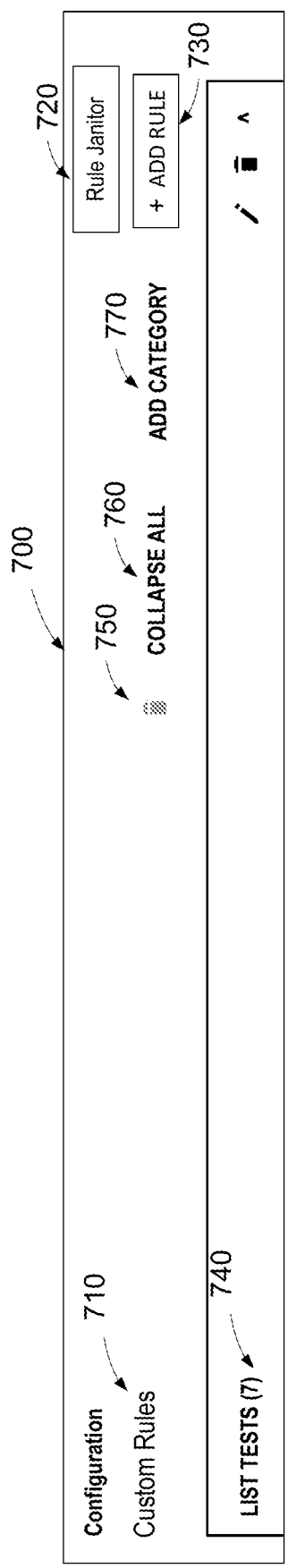
FIG. 7 illustrates a rule customization interface, in accordance with some example embodiments.

A user interface can be provided to assist the user in easily generating a rule recommendation report. FIG. 7 illustrates a rule customization interface, in accordance with some example embodiments. The user interface shown in FIG. 7 allows the user to identify the rules that the user would like to test. The managing of the rules by the rule janitor and the generation of the report can be performed through an access rule management application.

As shown in FIG. 7, a resource provider can customize and create rules. FIG. 7 illustrates a configuration interface 700 displaying a "Custom Rules" page 710 of an access rule management application, in accordance with some example embodiments. As shown in FIG. 7, the configuration interface includes a "Custom Rules" page 710 that includes a Rule Janitor button 720, an Add Rule button 730, a Test Results button 740, a delete button 750, a Collapse All button 760, and an Add Category button 770.

The Rule Janitor button 720 directs the user to a rule janitor page. The Add Rule button 730 directs the user to a page where they can add or modify the rules to profiles. The delete button 750 allows the user to easily delete rules and/or profiles that the user has identified for removal. The Collapse All button 760 minimizes the display of the test results. The Add Category button 770 allows the user to add a particular category of rules for evaluation.

Within the custom rules page 710 of the access rule management application, links can be generated which can direct the user to the tests performed by the janitor computer. The link for generating the report can be represented by a button 740 that is selectable by the user. If the user would like to add additional rules for testing, the user can select the add rule button 730. After all of the rules for testing are identified, the rule janitor button 720 can be selected in order to proceed with generating a report for the listed rules. After the user has selected the rule janitor button 720 of FIG. 7, the user can be directed to the report generator interface 800 of FIG. 8.

Figure 8:
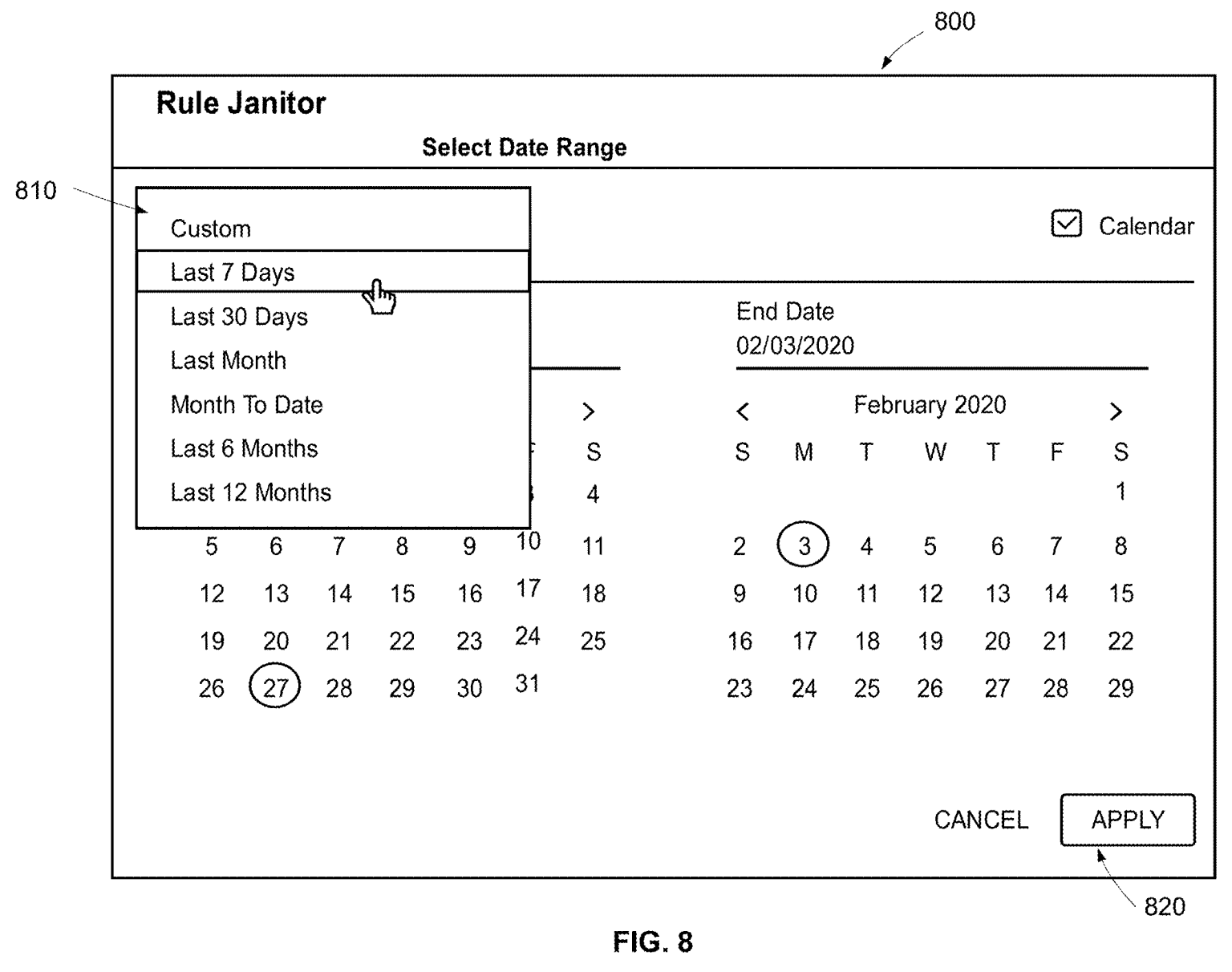

FIG. 8 illustrates a report generator interface 800, in accordance with some example embodiments. When the "Rule Janitor" button 720 of FIG. 7 is selected, the user is directed to the report generator interface 800 shown in FIG. 8.

The rule janitor report generator allows the user to select a date range for which they would like to test a rule. A user can customize the date range for testing the rule. The date rage can be entered by the user by using a calendar or by manually inputting a start and end date. A drop-down box 810 is provided in which a user can select to customize the date range or the user can select among a predetermined date range, such as "last 7 days," "last 30 days," "last month," "month to date," "last 6 months," and "last 12 months." The date ranges shown in FIG. 8 are merely examples, and the predetermined date ranges in the drop-down box can vary. For example, if a particular rule is triggered frequently or within a very short period of time, the user may select a time range of one hour or one day.

After the user has identified their desired date range, the user can select the "Apply" button 820. Selection of the "Apply" button 820 will result in the janitor computer running a test on the identified rules for the selected date range.

FIG. 9 illustrates a report 900 generated by the janitor computer, in accordance with some example embodiments. The report is generated for the rules and for the period of time that were selected by the user. The janitor computer generates the report shown in FIG. 9 independently and without user intervention.

The report provides the user with information regarding rules that should be retuned and rules of the user should consider removing FIG. 9 displays a report which includes profiles 901, rules 902, recommendation 903, rule creation date 904, rule modified date 905, last triggered date 906, trigger rate 907, trigger rate over period 908, number of reviews 909, number of unique reviews 910, number of unique reviewer rejections 911, number of unique reviewer accepts 912, percent of unique reviewer accepts 913, number of unique rejects 914, percent of unique rejects 915, number of unique Mark As Suspect (MAS) 916, percent of unique MAS 917, check boxes 918, and select all checkbox 919. MAS can be used to mark a transaction as 'Fraud Chargeback', 'Suspect', 'Non Fraud Chargeback', and 'Credit Back'.

The information shown in FIG. 9 can be stored on the data store 181 of the janitor computer 180. The report includes information for a plurality of different rules for a plurality of different profiles. The profile shown in FIG. 9 include "Digital Goods," "High Dollar," "Low Dollar" and "Public Standard Risk." The profile "Digital Goods" can include rules "Auth Issues," "Low Dollar Microsoft Attack," and "MS Office Fraud Ring 2." However, these are merely examples and different rules for different profiles can be analyzed.

The results shown in FIG. 9 include information for a plurality of different rules for a plurality of different profiles. However, example embodiments are not limited to the example shown in FIG. 9. The number of rules and number of profiles that are evaluated can vary based on the report results desired by the user.

The generated report can include a recommendation 903 which flags rules that should be check, removed, or accepted. Recommendation 903 is a recommendation provided by the janitor computer for particular rule in a particular profile. The possible recommendations can include "check," "remove," and "keep." The recommendation "check" notifies the user that they should check whether or not the rule should be kept in its current form, or whether the rule should be updated. The recommendation "remove" notifies user that a particular rule is not being used and the rule should be removed for the particular profile. The recommendation "keep" notifies the user that rule continues to be used for the particular profile and that no changes are needed to the rule or the profile.

The different recommendations can appear in different colors. For example, rules to be evaluated for removal can appear in red, rules to be check can appear in yellow, and rules that can be accepted can appear in green. Therefore, based on the color associated with the recommendation, the user can easily visibly determine the status of a rule.

The user can select a checkbox 918 for a particular rule the user would like to delete, and then subsequently select a delete button. Alternatively, if the user decides they would like to delete all of the rules, the select all checkbox 919 can be selected. Therefore, the user can easily delete some or all of the rules. Further, the user can easily determine which rules should be checked, removed, or accepted. The user can also easily filter and sort through the generated report.

Over time, the janitor computer can learn from the actions of the user. That is, based on historical data, the janitor computer can independently identify which rules the user has removed, kept or checked in the past. Therefore, the janitor computer can independently determine which rules should be removed without requiring user intervention.

To further ease the process of reviewing the evaluation results, a wizard can be provided that can easily guide the user in removing unneeded rules. A wizard can be provided which prompts the user through a series of questions to determine whether certain rules for certain profiles should be removed. Thereby making it even easier for the user to remove unneeded rules and any unneeded profiles.

An analyst, such as a manage risk analyst, can review the report to determine which rules should be removed, checked or should be kept. However, the generated report and the wizards makes it easier for the analyst to make such decisions.

VI. Access Server

Figure 10:
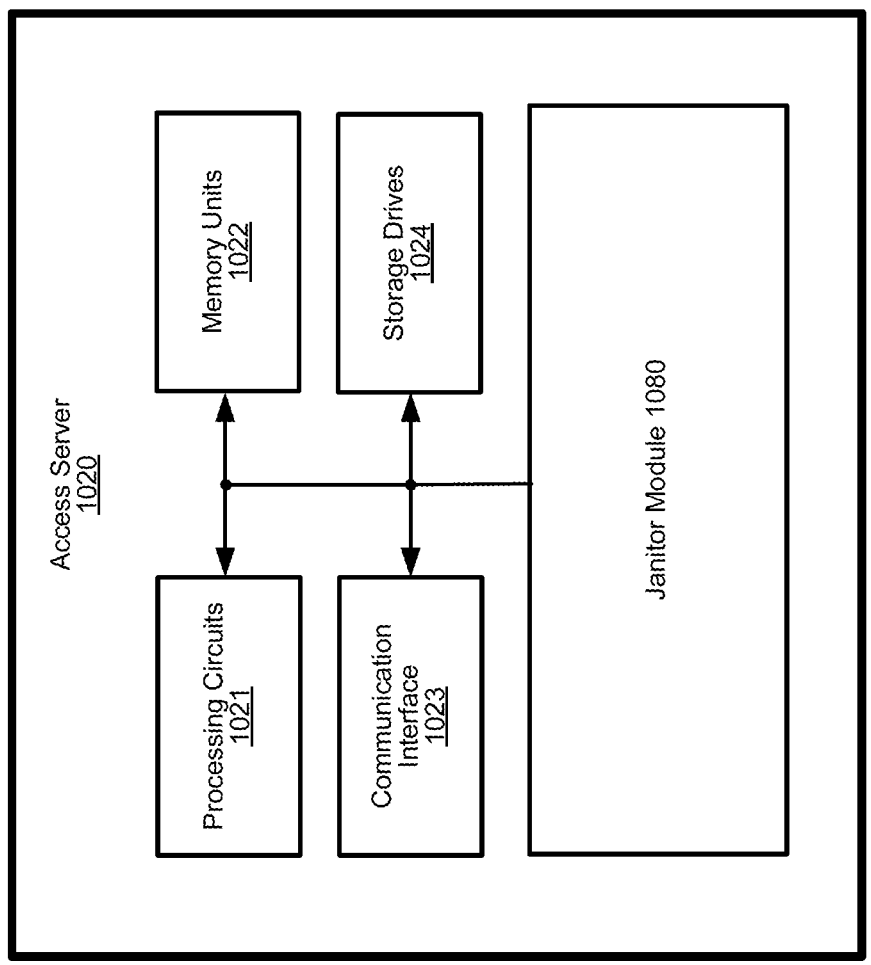
FIG. 10 illustrates an access server, in accordance with some example embodiments.

FIG. 10 shows a functional block diagram of components of an exemplary computer system including an access server 1020, in accordance with some embodiments. The various components may be embodied by computer hardware or computer code stored on a non-transitory computer readable storage medium.

The access server 1020 may comprise one or more processor circuits 1021. The processor circuits 1021 may execute instructions to perform the functions of the access servers described herein (e.g., operating access rules to accept, reject, or review access requests). The processor circuits 1021 may be coupled to one or more memory units 1022 that are configured to store data and instructions. The memory units 1022 may be non-transitory computer-readable storage medium. The processor circuits 1021 may read data from the memory units 1022 and write data to the memory units 1022. For example, the processor circuits 1021 may load into the memory units 1022 a plurality of access request rules and parameters of an access request in order to determine an access request outcome, as described herein.

The access server 1020 may also comprise a communication interface 1023. The communication interface 1023 may receive communications from a communication interface of another computer, such as communications from a resource computer or an access server. The communication interface 1023 of the access server 1020 may communicate with the communication interface 1023 of the access rule generation system 1030. The communication interface 1023 may also transmit communications to another computer. The access server 1020 may receive access request information and access request parameters via the communication interface 1023.

The access server 1020 may also comprise one or more storage drives 1024. The storage drives 1024 may be directly coupled to the access server 1020 or they may be network accessible storage drives 1024. The storage drives 1024 may comprise one or more databases for storing the access request information and the access request parameters. The storage drives 1024 may store data that may be loaded into the memory units 1032 by the processor circuits 1021.

The access server 1020 can also include janitor computer 1080. The janitor computer 1080 can correspond to janitor computer 180 described with respect to FIG. 2 above.

VII. Computer System

Figure 11:
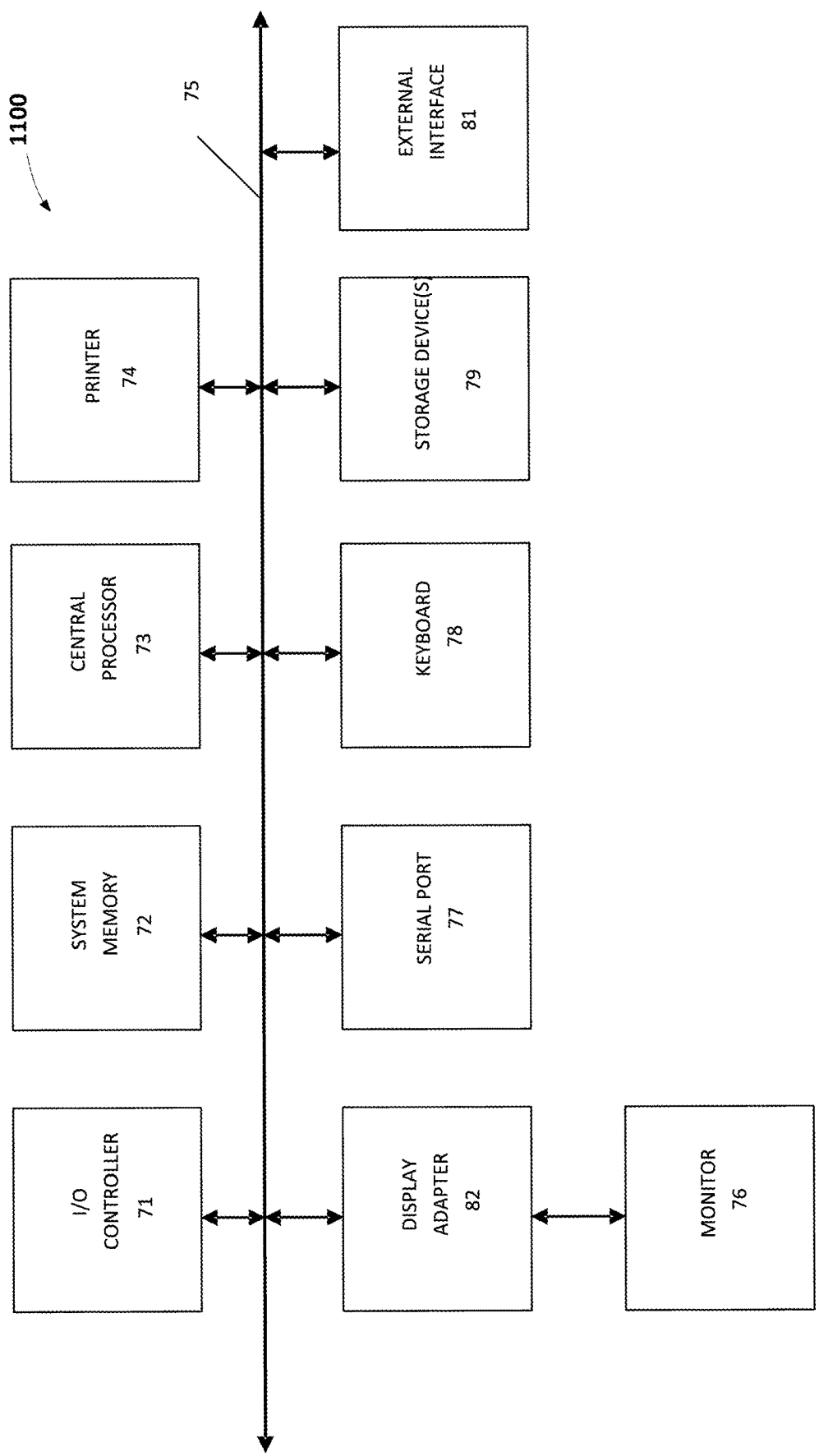
FIG. 11 illustrates a block diagram of a computer apparatus, in accordance with some example embodiments.

FIG. 11 is a high level block diagram of a computer system 1100 that may be used to implement any of the entities or components described above. The computer system 1100 can be included in a request processing system.

The subsystems shown in FIG. 11 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art, such as serial port 77. For example, serial port 77 or external interface 81 (e.g., Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

It should be understood that any of the embodiments can be implemented in the form of control logic using hardware (e.g., an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C, C++, C# or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the disclosure. However, other embodiments may be directed to specific embodiments relating to each individual aspect, or specific combinations of these individual aspects.

For the purposes of explanation, specific details are set forth in order to provide a thorough understanding of the exemplary embodiments. However, it will be apparent that various embodiments may be practiced without these specific details. For example, circuits, systems, algorithms, structures, techniques, networks, processes, and other components may be shown as components in block diagram form in order not to obscure the embodiments in unnecessary detail.

The above description is illustrative and is not restrictive. Many variations will become apparent to those skilled in the art upon review of the disclosure. The scope should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for managing a plurality of access rules performed by a computer device comprising a processor and a memory, the method comprising:
   receiving a first access rule from the plurality of access rules for evaluation;
   determining a first profile associated with the first access rule,
   loading the first access rule and the first profile into the memory;
   receiving a designated period of time for performing the evaluation of the first access rule;
   initializing a counter associated with the first access rule for the first profile, wherein the counter tracks a triggering of the first access rule for the first profile during the designated period of time, wherein the counter stores a counter value;
   receiving a plurality of access requests during the designated period of time;
   determining whether one or more of the plurality of access requests trigger the first access rule;
   incrementing the counter value for each instance that the first access rule is triggered by an access request of the plurality of access requests during the designated period of time;
   calculating a first trigger percentage for the first access rule based on the counter value of the first access rule during a first subset of time of the designated period of time;
   calculating a second trigger percentage for the first access rule based on the counter value of the first access rule during a second subset of time of the designated period of time;
   determining a trigger percentage difference between the first trigger percentage and the second trigger percentage;
   determining whether the trigger percentage difference is statistically significant; and
   providing a recommendation regarding the first access rule for the first profile in response to determining that the trigger percentage difference is statistically significant.

2. The method according to claim 1, wherein the trigger percentage difference is statistically significant when the trigger percentage difference is above a predetermined threshold.

3. The method according to claim 1, wherein when the trigger percentage difference is in within a first range, provide a recommendation to remove the first access rule.

4. The method according to claim 3, wherein when the trigger percentage difference is in within a second range that is less than the first range, provide a recommendation to check the first access rule.

5. The method according to claim 4, wherein when the trigger percentage difference is in within a third range that is less than the second range, provide a recommendation to accept the first access rule.

6. The method according to claim 1, wherein the recommendation comprises a report that is displayed on an interactive user interface.

7. The method according to claim 6, wherein the report identifies whether the first access rule should be removed, checked or accepted.

8. The method according to claim 1, wherein the first subset of time is earlier in time than the second subset of time.

9. The method according to claim 1, wherein the plurality of access requests are received in real time.

10. The method according to claim 2, wherein in response to determining that the trigger percentage difference is above the predetermined threshold, automatically removing the first access rule from the first profile.

11. A server computer comprising:
    a processor;
    a memory;
    a computer readable medium coupled to the processor, the computer readable medium storing instructions executable by the processor for implementing a method comprising:
    receiving a first access rule from a plurality of access rules for evaluation;
    determining a first profile associated with the first access rule,
    loading the first access rule and the first profile into the memory;
    receiving a designated period of time for performing the evaluation of the first access rule;
    initializing a counter associated with the first access rule for the first profile, wherein the counter tracks a triggering of the first access rule for the first profile during the designated period of time, wherein the counter stores a counter value;
    receiving a plurality of access requests during the designated period of time;
    determining whether one or more of the plurality of access requests trigger the first access rule;
    incrementing the counter value for each instance that the first access rule is triggered by an access request of the plurality of access requests during the designated period of time;
    calculating a first trigger percentage for the first access rule based on the counter value of the first access rule during a first subset of time of the designated period of time;
    calculating a second trigger percentage for the first access rule based on the counter value of the first access rule during a second subset of time of the designated period of time;
    determining a trigger percentage difference between the first trigger percentage and the second trigger percentage;
    determining whether the trigger percentage difference is statistically significant; and providing a recommendation regarding the first access rule for the first profile in response to determining that the trigger percentage difference is statistically significant.

12. The server computer according to claim 11, wherein the trigger percentage difference is statistically significant when the trigger percentage difference is above a predetermined threshold.

13. The server computer according to claim 11, wherein when the trigger percentage difference is in within a first range, provide a recommendation to remove the first access rule.

14. The server computer according to claim 13, wherein when the trigger percentage difference is in within a second range that is less than the first range, provide a recommendation to check the first access rule.

15. The server computer according to claim 14, wherein when the trigger percentage difference is in within a third range that is less than the second range, provide a recommendation to accept the first access rule.

16. A system for review of access rules, the system comprising:
a server computer, comprising a processor and a memory, configured to:
receive a first access rule from a plurality of access rules for evaluation;
determine a first profile associated with the first access rule,
load the first access rule and the first profile into the memory;
receive a designated period of time for performing the evaluation of the first access rule;
initialize a counter associated with the first access rule for the first profile, wherein the counter tracks a triggering of the first access rule for the first profile during the designated period of time, wherein the counter stores a counter value;
receive a plurality of access requests during the designated period of time;
determine whether one or more of the plurality of access requests trigger the first access rule;
increment the counter value for each instance that the first access rule is triggered by an access request of the plurality of access requests during the designated period of time;
calculate a first trigger percentage for the first access rule based on the counter value of the first access rule during a first subset of time of the designated period of time;
calculate a second trigger percentage for the first access rule based on the counter value of the first access rule during a second subset of time of the designated period of time;
determine a trigger percentage difference between the first trigger percentage and the second trigger percentage;
determine whether the trigger percentage difference is statistically significant; and
providing a recommendation regarding the first access rule for the first profile in response to determining that the trigger percentage difference is statistically significant.

17. The system according to claim 16, wherein the trigger percentage difference is statistically significant when the trigger percentage difference is above a predetermined threshold.

18. The system according to claim 16, wherein when the trigger percentage difference is in within a first range, provide a recommendation to remove the first access rule.

19. The system according to claim 18, wherein when the trigger percentage difference is in within a second range that is less than the first range, provide a recommendation to check the first access rule.

20. The system according to claim 19, wherein when the trigger percentage difference is in within a third range that is less than the second range, provide a recommendation to accept the first access rule.

* * * * *